United States Patent [19]

Wisner et al.

[11] 3,909,744

[45] Sept. 30, 1975

[54] UNSTABLE RESONATOR SYSTEM PRODUCING A HIGH IRRADIANCE BEAM IN THE FAR FIELD

[75] Inventors: George R. Wisner, Deep River; Stuart N. Mapes, West Hartford; Michael L. Skolnick, Trumbull, all of Conn.

[73] Assignee: United Technologies Corporation, Hartford, Conn.

[22] Filed: Sept. 24, 1973

[21] Appl. No.: 400,306

[52] U.S. Cl. ............................................ 331/94.5 C
[51] Int. Cl.² .................................................. H03F
[58] Field of Search ................. 331/94.5 C, 94.5 D; 350/189, 286, 287, 294, 299

[56] References Cited
UNITED STATES PATENTS

| | | | |
|---|---|---|---|
| 2,759,393 | 8/1956 | McLeod | 350/189 |
| 2,891,437 | 6/1959 | Tripp | 350/294 |
| 3,419,321 | 12/1968 | Barber et al. | 350/286 |
| 3,453,425 | 7/1969 | Whitaker | 350/294 |
| 3,547,526 | 12/1970 | Devereux | 350/286 |

OTHER PUBLICATIONS

McIntyre, "Optical Components and Technology in Laser Space Communication Systems," Proceedings of IEEE, Vol. 58, No. 10, Oct. 1970, p. 1491–1503.
Peters et al., "Techniques For Matching Laser TEM Mode to Obscured Circular Aperture," Applied Optics, Vol. 9, No. 6, June 1970, p. 1435–1442.

*Primary Examiner*—Alfred E. Smith
*Assistant Examiner*—Michael J. Tokar
*Attorney, Agent, or Firm*—Anthony J. Criso

[57] ABSTRACT

Laser systems comprising an unstable resonator and optics for increasing the magnification of the output beam from the resonator to concentrate the power distribution in the far field are disclosed. The resonator device produces a beam of laser energy which is an annulus in cross section and matched optics change the energy distribution in the annulus; both refractory and reflecting optics are disclosed. Also graphs describing the intensity distribution of the annular beam under various conditions in both the near field and far field locations in the optical system are provided.

6 Claims, 11 Drawing Figures

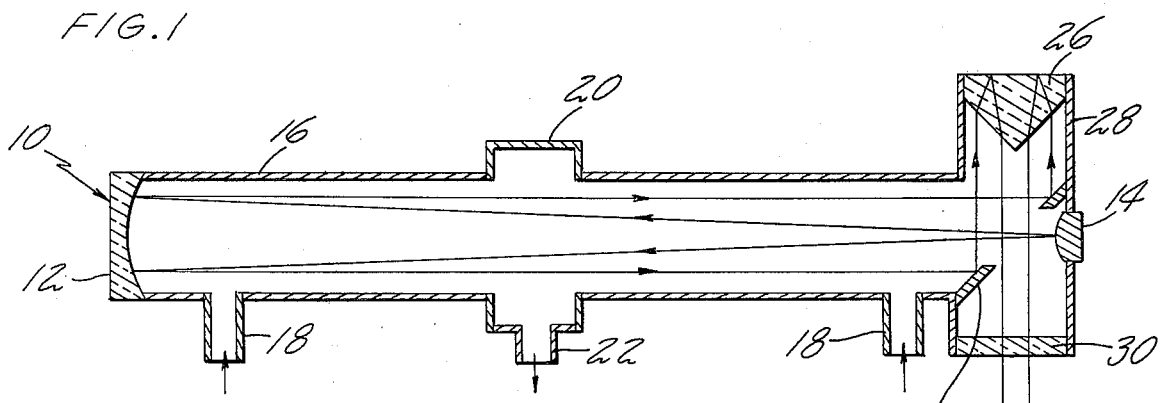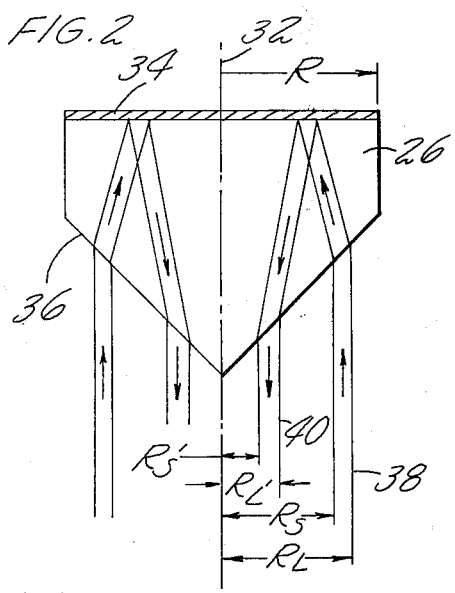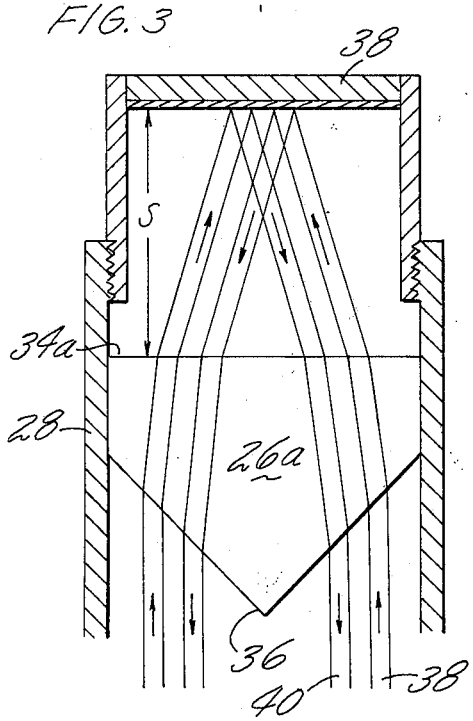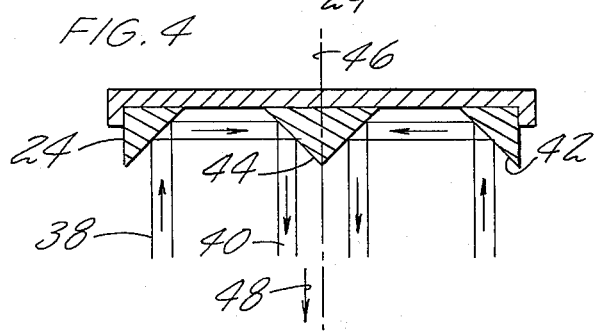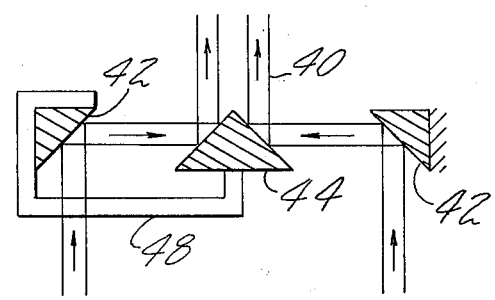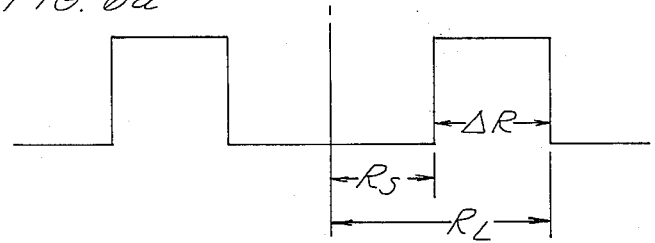

UNSTABLE RESONATOR SYSTEM PRODUCING A HIGH IRRADIANCE BEAM IN THE FAR FIELD

BACKGROUND OF THE INVENTION

1. Field of Invention

The present invention relates to laser systems and more particularly to the production of an annular beam of electromagnetic radiation having a high irradiance in the far field distribution.

2. Description of the Prior Art

The continued development of various laser devices has intensified the effort to utilize the gain medium in a laser resonator more efficiently. Typical stable resonators designed to operate at optical or near optical wavelengths tend to resonate collimated beams of relatively small diameter and, consequently, the population inversion available in the gain medium is only partially depleted. Resonators having a large mismatch between the dimensions of the gain medium and the operating mode are inefficient and provide less output power than is theoretically available. These considerations often lead to devices in which the laser beam makes multiple passes through the gain medium along a folded optical path. Multiple pass devices utilize the gain medium more efficiently, however, they tend to become physically complicated since an integrated collection of suitably aligned reflecting surfaces and associated structures are required to provide the multiple passes. An alternate approach is to provide a resonant cavity which is optically unstable so that the volume swept by the laser beam passing through the resonator can be made almost arbitrarily large to more closely approximate the actual dimensions of the available gain medium. Unstable systems avoid the small diameter modes which are characteristic of the stable resonator family, however, they provide an output laser beam which tends to be in the form of a thin annulus having a low magnification in the near field. The term magnification as used herein is the ratio of the outside to inside diameter of an annulus. The energy in a laser beam which is an annulus in the near field cannot be sufficiently focused in the far field for many applications.

SUMMARY OF THE INVENTION

A primary object of the present invention is to provide an annular beam of laser energy with a laser system in which the far field distribution of the beam may be optimized independent of the laser resonator operating characteristics. Also, this invention is intended to provide a laser beam having an annular distribution of high irradiance in the far field with a system including an unstable resonator. Further, the present invention provides improved focusability of an annular beam of laser radiation.

The present invention is predicated on the recognition that the relative intensity in an annular beam of coherent radiation which occurs in a given solid angle in the far field depends on both the outer diameter and the magnification of the annulus. In the specific limiting case of an annulus with an inner diameter of zero, a magnification of infinity, the annular beam is in fact a uniformly illuminated disk with a circular cross section. The beam can be focused on the far field to a center spot having a set of concentric rings and the bulk of the energy is contained in the spot. When the cross section of the beam is an annulus, its magnification is decreased and a larger portion of the energy in the annular beam appears in the rings concentric about the far field spot with the proportion of energy in the rings increased as the magnification of the annulus is decreased.

According to the present invention, a collimated beam of laser radiation is produced in an unstable resonator and the periphery of the beam is formed into an annular beam which is increased in magnification with suitable optics to yield a disk pattern in the far field, the pattern having an energy density approaching the theoretical limit for uniform illumination.

In a single conical surface embodiment of the present invention, a collimated beam is produced in an unstable resonator having a centerline axis and the periphery of the beam is formed into an annular column with an annular mirror which is positioned concentrically about the axis; the annular beam is directed into a lens having a mirrored back surface and the annulus is reduced in diameter and reflected back through the center opening in the annular mirror as an annular output beam having an increased magnification. In a two-conical surface embodiment of the present invention reflecting optics are used to reduce the diameter of the annular beam and increase its magnification. In still another embodiment of the present invention the annular beam from the resonator is increased in magnification with reflecting optics and the annular output beam leaves the system without passing back through the annular coupling mirror.

A primary advantage of the present invention is the ability to optimize the operating conditions of an unstable resonator essentially independently of an optimization of the far field energy distribution of the output beam from the resonator. Also, the annular coupling mirror can be located physically close to the magnification optics thereby facilitating beam processing before the beam experiences diffractive effects. In addition, the optics used to change the beam magnification can be supported without introducing any obstructions into the path of beam propagation and the alignment sensitivity of the entire intensity redistribution system is compatible with the limitations of practical systems. A further advantage of the present invention is the wide range over which the magnification of an annular beam can be controlled due to the adjustable feature inherent in the device. In the embodiments employing refractive elements to change the magnification of the annular beam, only one conical surface is required since the beam path is folded inside a single lens.

A primary feature of the present invention is the ability to control the intensity distribution of an annular beam of radiation in the far field. In addition, the beam can have a large magnification which permits good focusability of the beam. The present invention allows the production of laser energy having a far field distribution which approaches an Airy distribution although the fundamental concepts disclosed are equally applicable to either circular or two-dimensional geometries. Other features include the production of a beam of collimated radiation in an unstable resonator and retention of the collimation feature throughout the process of changing the magnification of the annular beam. The annular beam from the resonator is coaxial with the magnification optics resulting in an output beam that is coaxial with the annular beam from the resonator. Further, the annular coupling mirror directs the annular beam to the magnification optics so that the system output beam may leave the system through the center hole in the annular mirror. In the case of refractive magnification optics, the present invention is characterized by an antireflective front surface on the lens and a maximum reflectivity rear surface on the lens; a single apexed surface on the lens element causes a double refraction of the laser radiation in its travel along the folded path of propagation.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a simplified schematic elevation diagram of a typical unstable resonator system used to provide a collimated annular beam of laser energy in accordance with the present invention;

FIG. 2 is a simplified schematic diagram of the refractive optics used to change the magnification of the annular output beam from the resonator shown in FIG. 1;

FIG. 3 is a simplified schematic diagram of an adjustable embodiment of the refractive optics;

FIG. 4 is a simplified schematic diagram of a reflective optical system which reverses the direction of propagation while changing the magnification of the resonator annular output beam;

FIG. 5 is a simplified schematic diagram of the reflective optics which changes the magnification of the resonator output beam and produces a forwardly propagating output beam;

FIG. 6a is a simplified graph showing the intensity profile in the near field for an annular beam having a uniform intensity profile;

FIG. 6b is a simplified graph showing the corresponding intensity profile after the annulus has undergone magnification;

DESCRIPTION OF PREFERRED EMBODIMENTS

Figure 7:
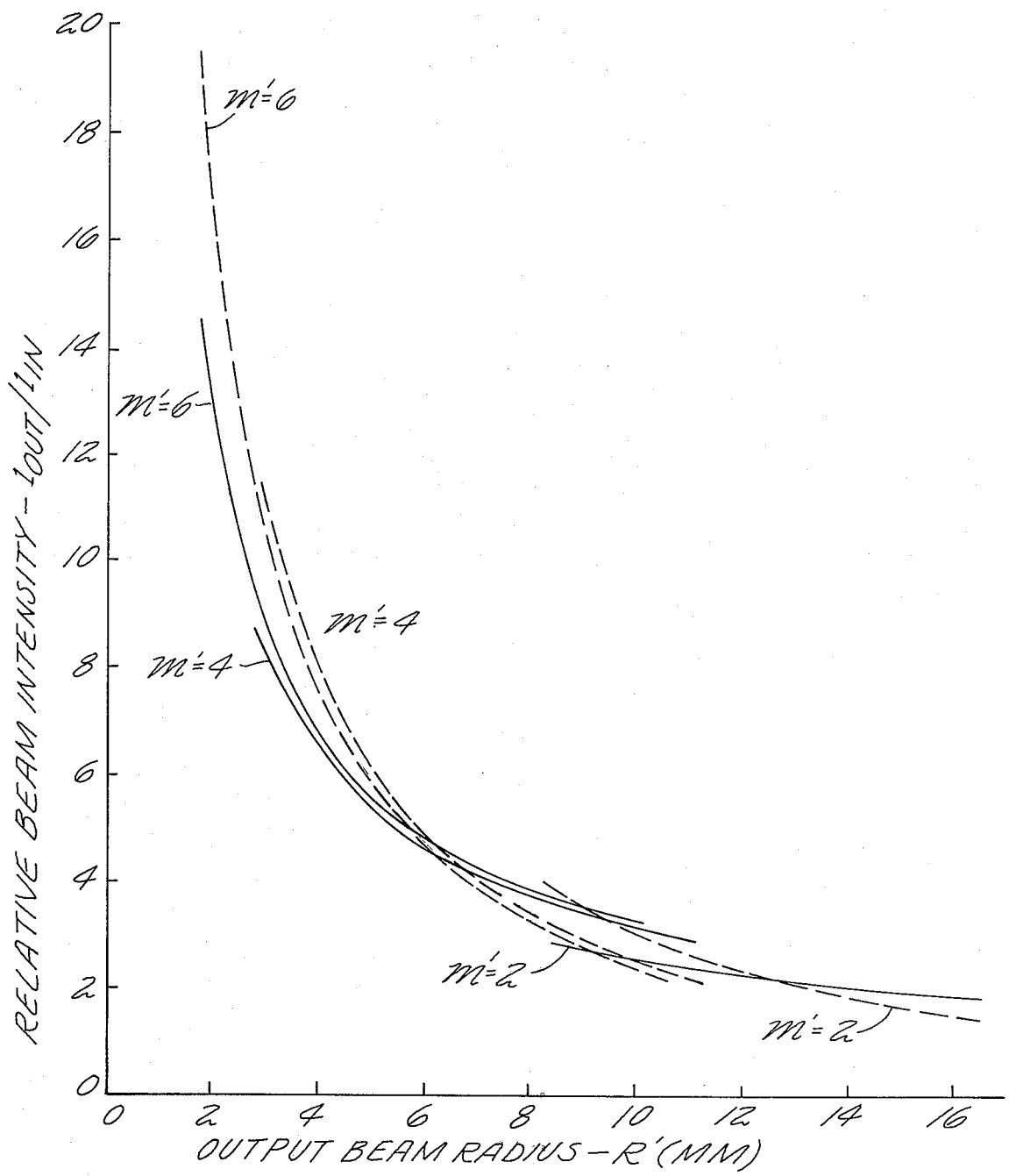
FIG. 7 is a graph showing the ratio in the near field of the radiation intensity for a magnified annulus with respect to a uniformly distributed annulus as a function of radius.

A convectively cooled, carbon dioxide, electric discharge, gas laser is shown in FIG. 1; the device is a typical unstable resonator and its operating characteristics are discussed in detail in Unstable Resonators For $CO_2$ Electric Discharge Convection Lasers, G. R. Wisner et al., Applied Physics Letters, Vol. 22, No. 1, January 1973, page 14. The laser 10 is an unstable resonator formed between a concave mirror 12 and a convex mirror 14. The gas envelope consists primarily of a pair of pyrex tubes 16 each of which has a gas inlet 18 and a common flow plenum 20 with a gas outlet 22. Also shown in FIG. 1 is an annular coupling mirror 24 and a fixed lens 26 which is structurally supported by a sleeve extension 28 of the main resonator structure. The auxiliary equipment such as supply gas, pumps and electrical sources are not shown, however, the gas enters through each of the inlets and leaves through the outlet 22; the inlets also act as cathodes for the electric discharge and the outlet is a common anode for each of the cathodes.

The resonator shown in FIG. 1 provides an annular beam of 1500 watts of power when operated with the following parameters. The resonator mirror separation is approximately 3 meters and each of the two excitation electric discharges is approximately eighty centimeters in length; the pyrex tubes are 75 millimeters in diameter. The Fresnel Number of the cavity is 35 and the equivalent Fresnel Number for the data presented hereinafter is 3½ which corresponds to a mode diameter of 66 millimeters; the resonator output beam annulus magnification is one and thirty five one hundredths. The working medium is flowed through the resonator at approximately 1200 liters per second.

FIG. 2 is a more detailed development of the single conical surface refractive element 26 shown in FIG. 1. The main body of the lens is in the form of a cylinder having a central axis 32 and a radius R of 7½ centimeters. The germanium lens has a flat back surface 34 which is perpendicular to the axis and this surface is gold coated to be fully reflective as is shown in FIG. 2 with respect to carbon dioxide radiation. The lens also has a front surface 36 which is conical and has a 90° apex angle; the conical surface is coated with a compound such as thorium fluoride, which is an antireflective material used to enhance the transmission of the carbon dioxide radiation. The one point three five magnification for the case of an annular beam 38 having a diameter of 66 millimeters is equal to the ratio of $R_L$ to $R_S$; since $R_L$ is 33 millimeters, $R_S$ is approximately 24 millimeters. Similarly, the system output beam 40 has a magnification M' equal to the magnitude of the $R'_L$ to $R'_S$ and data representing a range of output magnifications will be discussed hereinafter.

FIG. 3 shows an adjustable refractive lens 26a having a rear surface 34a which is not reflective, rather it is coated with antireflective material. The lens cooperates with a fully reflecting mirror 38 which is adjustably mounted to the resonator tube 28. With a variable separation distance S as shown in FIG. 3, the magnification of the system output beam 40 can be adjusted even though the resonator output beam 38 is of fixed diameter.

FIGS. 4 and 5 are schematic representations of reflecting optics which can perform essentially the same function as the lens systems shown in FIGS. 2 and 3. The apparatus of FIG. 4 utilizes two precisely matched conical reflecting surfaces 42, 44 which are concentrically aligned on a mirror axis 46; the cones increase the magnification of an annular beam. During the process, the outer diameter of the beam is reduced and the beam of increased magnification is propagated in a direction 48 opposite to the incoming beam 40 along a path which is also concentric about the mirror axis. Similarly, the analogous apparatus shown in FIG. 5 comprises a matched pair of conical reflecting surfaces which increases the magnification of an annular beam and reduces its diameter. This alternate structure propagate the system output beam 40 in the same direction as is the annular beam 38, however, a supporting strut 48 is introduced into the beam path.

The single mode output of an unstable resonator is theoretically a thin annulus with an almost uniform phase intensity. Many applications involving the use of such unstable resonators require that the annular output beam be focused in the far field to as small a spot as possible. Various theoretical considerations have shown that the power contained within a solid angle in the far field is a function of both the outside diameter and the magnification of the annular beam. For example, a completely filled-in annulus which is a uniformly illuminated disk having a magnification factor of infinity results in the classical Airy distribution in the far field. However, as the magnification decreases for an annular ring of fixed outside diameter, the power distribution in the far field gradually shifts from the center disk to the rings concentrically surrounding the disk.

The annular output from typical unstable resonators such as the one shown in FIG. 1 produces an annular beam having a magnification in the range of one point two to two and when such beams are focused, the power in the center disk of the far field distribution is between approximately 14 and 48 percent of the total power in the annular beam. In accordance with the present invention, an unstable resonator in combination with suitable magnification optics such as those shown in the drawing permits a reduction in both the large and small diameters of the annulus while maintaining the magnitude of the difference between these diameters constant. The result is an increase in the magnification of the annular beam and an increase in the fraction of the power contained in the center disk in the far field distribution to approximately 84 percent. These effects are brought about with a concomitant change in the near field intensity distribution which after an increase in magnification is a maximum at the small diameter of the annulus and decreases with increasing diameter. A laser beam having any one of many annular intensity profiles can be produced with an unstable resonator, however, through careful design, the profile can be made to approach a uniform intensity such as the one shown in FIG. 6a. To facilitate the discussion herein, the profile intensity from the resonator shown in FIG. 1 is presumed to be uniform. When an annulus of uniform intensity undergoes a change in magnification in accordance with the present invention, the intensity in the near field assumes a profile as is shown in FIG. 6b. Although the inner and outer diameters of the annulus decrease as the magnification is increased, the difference between the maximum and minimum radii remains unchanged for all values of magnification.

The ratio of the intensity of an annular beam which has been collapsed in diameter with respect to the intensity of the beam prior to magnification is shown for a specific set of parameters in FIG. 7. An annulus having a large radius, $R_L$, of 33 millimeters and a magnification of one point three five was selected as a matter of convenience in the light of the resonator previously described. The relative beam intensity, ratio of output beam intensity to input beam intensity, is plotted as a function of the radius of the output beam, $R'$, for various values of output beam magnification. The input and output terminology is descriptive of the annular beam with respect to optical means used to change its magnification. The dotted curves in FIG. 7 represent a magnifier which collapses a beam and reverses its path so that the collapsed beam travels back along the axis of the incoming beam; the solid curves in FIG. 7 represent a magnifier which collapses the incoming beam and directs it away in the same direction as the incoming beam. The physical meaning of any point on the curves shown is the near field relative intensities of a beam before and after a change in magnification at any radius over which the annulus extends.

Figure 8:
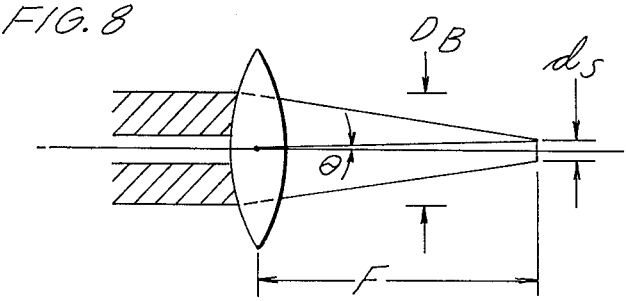
FIG. 8 is a schematic diagram of an annulus in combination with a lens illustrating the geometrical parameters which relate the near field and the far field beam intensities.

FIG. 8 shows the geometrical considerations which relate the near and far field beam intensities for an annulus. In the special case of a near field intensity distribution which is a uniformly illuminated disk, a beam of infinite magnification, the far field distribution is an Airy distribution, and the near field and far field parameters are related by the equation $d_s = (2.44 F\lambda/D_B)$ where $d_s$ is the spot diameter in the far field, $F$ is the focal length of the lens, is is the wavelength of the radiation, and $D_B$ is the diameter of the annular beam.

A convenient parameter for describing the angular extent of the central spot of the beam in the far field is the beam half angle, $\theta$, which will be proportional to the quotient of lambda over the beam diameter. The equation is quite general and the constant of proportionality between the half angle and the $\lambda/D$ parameter varies as a function of the near field distribution. For the particular case of an Airy distribution, the constant of proportionality is one point twenty-two.

Figure 9:
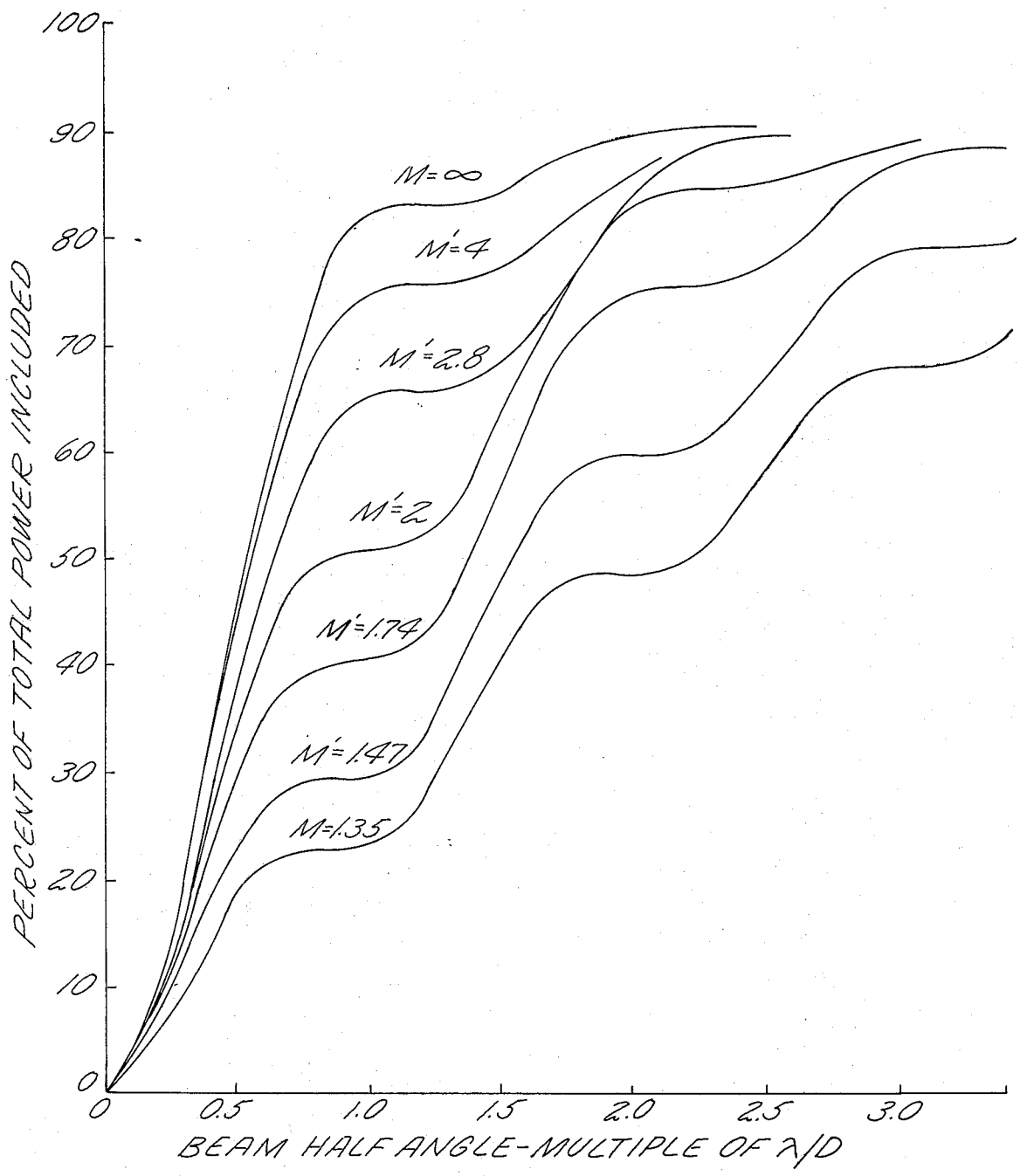
FIG. 9 is a graph showing the percent of the total power in the far field for an annular beam as a function of the beam half angle for various values of magnification.

FIG. 9 is a plot of the percent of total beam power in the far field of an annular beam as a function of the half angle; the parameter is the magnification of the annular beam and the beam half angle is given in multiples of $\lambda/D$. The plot is actually the far field transform of some of the curves shown in FIG. 7. The graph illustrates the transfer of radiation from the outer rings to the center disk in the far field distribution as the magnification of the beam is increased. A tangible physical result of the beam collapser is the concentration of the energy from an annular beam into the central spot of the far field distribution, an effect which is especially useful in applications such as welding and cutting.

When a uniform annulus such as is shown in FIG. 6a is magnified, the intensity in the near field tends to peak along the inner radius of the annulus as is shown in FIG. 6b. Although a peaked distribution of this type is intuitively expected to cause the center distribution in the far field to spread, the actual result is exactly contrary and in fact the center distribution contains more power.

Figure 10:
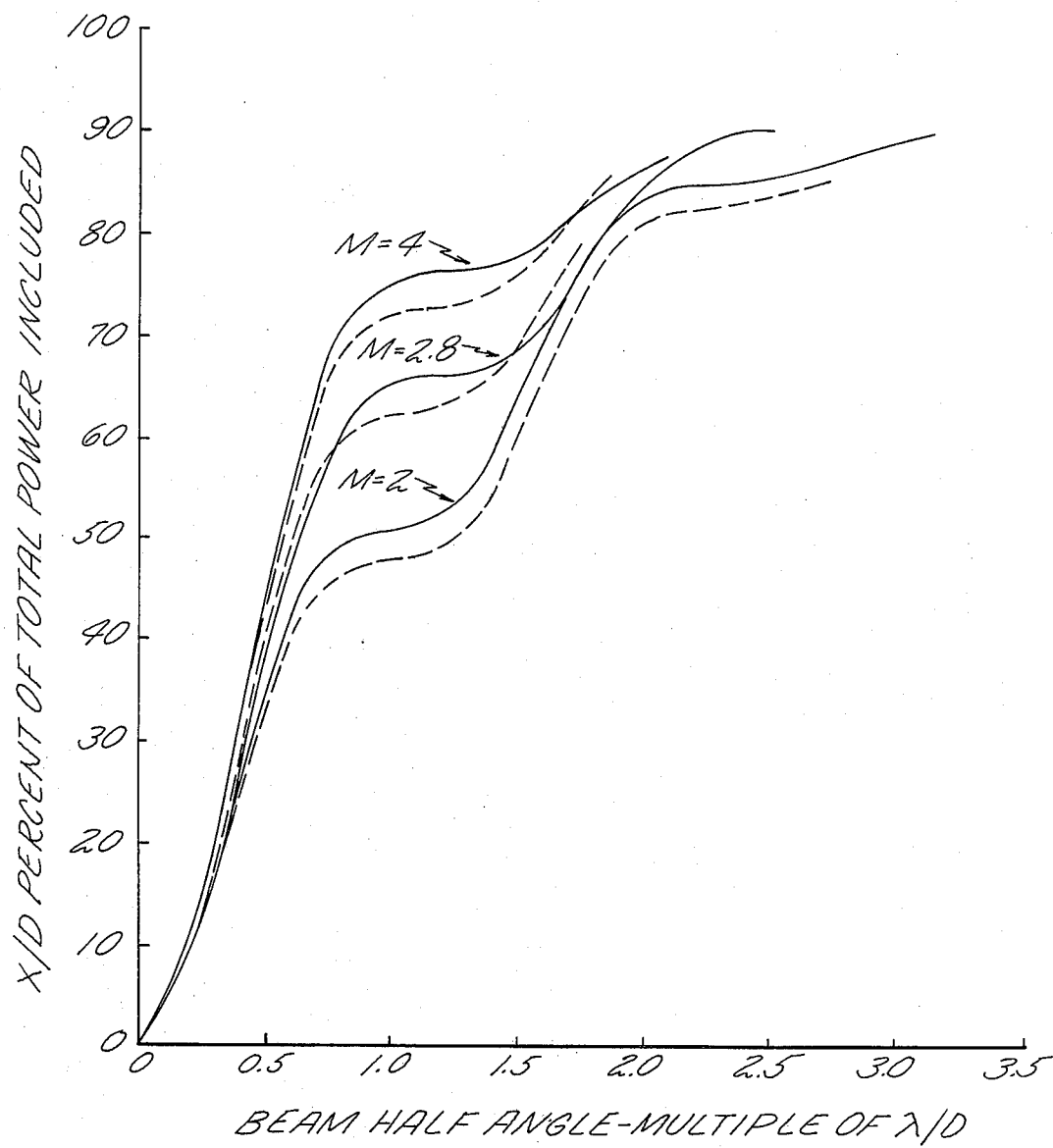
FIG. 10 is a graph showing the percent of the total power in the far field as a function of the beam half angle for uniform annulus and magnified annulus distributions.

FIG. 10 compares the fraction of total power in the far field included within a given beam half angle for a collapsed annular beam, with an annular beam of the same magnification whose intensity distribution is uniform. The fraction of total power included within the center disk for each case of magnification is higher for the collapsed distribution which are shown as solid lines than it is for the ideal uniform annulus which are shown as dotted lines.

The present invention has been discussed above in terms of a carbon dioxide laser system producing radiation at about ten microns. The teachings disclosed are readily applicable to other wavelengths as well as other laser systems entirely. Similarly, the disclosure relates primarily to annular beams of radiation and circular optics, however, two-dimensional systems are readily accommodated.

Although this invention has been shown and described with respect to preferred embodiments thereof, it should be understood by those skilled in the art that various changes and omissions in the form and detail thereof may be made therein without departing from the spirit and scope of the invention.

Having thus described typical embodiments of our invention, that which we claim as new and desire to secure by Letters Patent of the United States is:

1. A system for the production of an output beam of laser radiation which is highly focusable in the far field comprising:

optical means forming an unstable resonator having an optical axis internal of the resonator and along which a collimated beam of laser radiation is produced by the stimulated emission of radiation in a gain medium disposed in the resonator, the beam comprising an inner portion symmetrically disposed about the optical axis and an outer portion symmetrically disposed about the inner portion;

a coupling mirror inclined with respect to the optical axis and including a reflective surface having an aperture, the mirror being symmetrically disposed about the optical axis to intercept the outer portion of the collimated beam with the reflective surface and reflect the intercepted portion of the beam out of the resonator symmetrically about a central axis which is nonparallel to the optical axis while allowing passage of the inner portion of the beam through the aperture, the near field radiation distribution across the beam reflected out of the resonator having a center void; and beam collapser means symmetrically disposed about the central axis and in close proximity to the optical axis for decreasing the size of the center void while maintaining the beam collimated.

2. A laser for the production of laser radiation having an annular distribution in the near field and a small spot size in the far field comprising:

optical means forming an unstable resonator having an optical axis internal of the resonator about which a collimated beam of laser radiation is produced by the stimulated emission of radiation in a gain medium disposed in the resonator, the beam having a circular cross section which is symmetrically disposed about the optical axis and includes an outer portion with a maximum radius $R_L$ and a minimum radius $R_S$ and an inner portion with a maximum radius $R_S$;

an annular coupling mirror comprising a reflective annulus having a center aperture with a radius $R_S$ symmetrically disposed about the optical axis to intercept the outer portion of the collimated beam with the annulus and reflect the intercepted portion of the beam out of the resonator as an annular beam concentric about a center void and symmetric about a central axis which is perpendicular to the plane of the annulus while allowing the inner portion of the beam to pass through the aperture, the distribution of the radiation in the near field for the annular beam having a maximum radius $R_L$ and a minimum radius $R_S$ with respect to the central axis; and beam collapser means symmetrically disposed about the central axis and in close proximity to the optical axis for increasing the ratio of $R_L$ the maximum radius to $R_S$ the minimum radius while maintaining the beam collimated by decreasing the area of the center void.

3. The invention according to claim 2 wherein the unstable resonator has a Fresnel Number greater than 35.

4. The invention according to claim 3 wherein the ratio of $R_L/R_S$ is in the range of 1 2/10 to 2.

5. The invention according to claim 2 wherein the beam collapser comprises a cylindrical refractive lens having a flat end surface which is coated with a reflective material and one conical end surface which is coated with an antireflective material, the lens being oriented with the conical surface nearest to the annular mirror so that the annular beam from the resonator enters the lens through the conical end surface, is refractively reduced in diameter, is reflected by the mirrored surface and leaves the lens through the conical end surface as a collimated annular output beam.

6. The invention according to claim 2 wherein the beam collapser is a two element reflector comprising a cone and a conical hole having a common alignment axis and identical cone angles.

* * * * *

UNITED STATES PATENT OFFICE
CERTIFICATE OF CORRECTION

PATENT NO. : 3,909,744
DATED : September 30, 1975
INVENTOR(S) : GEORGE R. WISNER ET AL It is certified that error appears in the above-identified patent and that said Letters Patent are hereby corrected as shown below:

Column 6, line 21            "is" first occurrence should read -- $\lambda$ --

Signed and Sealed this thirtieth Day of December 1975

[SEAL]

Attest:

RUTH C. MASON
*Attesting Officer*

C. MARSHALL DANN
*Commissioner of Patents and Trademarks*